(12) United States Patent
Cowburn et al.

(10) Patent No.: US 11,073,341 B2
(45) Date of Patent: Jul. 27, 2021

(54) BASKET FOR HEAT TRANSFER ELEMENTS FOR A ROTARY AIR PREHEATER

(71) Applicant: Arvos Ljungstrom LLC, Wellsville, NY (US)

(72) Inventors: Lawrence Gilbert Cowburn, Ulysses, PA (US); Scott Richard Duffney, Little Genesee, NY (US); James Leslie Bice, Ulysses, PA (US)

(73) Assignee: Arvos Ljungstrom LLC, Wellsville, NY (US)

( * ) Notice: Subject to any disclaimer, the term of this patent is extended or adjusted under 35 U.S.C. 154(b) by 0 days.

(21) Appl. No.: 16/319,952

(22) PCT Filed: Jul. 24, 2017

(86) PCT No.: PCT/US2017/043457
§ 371 (c)(1),
(2) Date: Jan. 23, 2019

(87) PCT Pub. No.: WO2018/022484
PCT Pub. Date: Feb. 1, 2018

(65) Prior Publication Data
US 2019/0242656 A1    Aug. 8, 2019

Related U.S. Application Data

(63) Continuation of application No. 15/219,800, filed on Jul. 26, 2016, now abandoned.

(51) Int. Cl.
*F23L 15/02* (2006.01)
*F28D 19/04* (2006.01)
*F28D 21/00* (2006.01)

(52) U.S. Cl.
CPC ....... *F28D 19/044* (2013.01); *F28D 21/0003* (2013.01)

(58) Field of Classification Search
CPC .......................... F28D 19/044; F28D 21/0003
USPC ............................................................ 165/8
See application file for complete search history.

(56) References Cited

U.S. PATENT DOCUMENTS

| 4,838,342 A | 6/1989 | Goetschius |
| 5,336,471 A | 8/1994 | Brophy et al. |
| 5,664,620 A * | 9/1997 | Ritter .................... F28D 19/044 165/4 |
| 5,664,621 A | 9/1997 | Brophy |

(Continued)

OTHER PUBLICATIONS

PCT International Search Report issued in PCT Application No. PCT/US2017/043457, dated Nov. 7, 2017, pp. 1-11.

(Continued)

*Primary Examiner* — Davis D Hwu
(74) *Attorney, Agent, or Firm* — Murtha Cullina LLP (57) ABSTRACT

A basket for an air preheater includes two metallic frames each having two corner pieces and two connector pieces. For each frame, one of the connector pieces is secured to one end of each of the corner pieces and another of the connector pieces is secured to an opposite end of each of the corner pieces thereby forming a rectangular opening in each frame. The basket includes two heavy gauge metallic sheets that are secured to the corner pieces, thereby spacing the frames equally apart from and parallel to one another thereby forming a channel between two of the sheets.

13 Claims, 6 Drawing Sheets

(56) References Cited

U.S. PATENT DOCUMENTS

| | | | |
|---|---|---|---|
| 5,893,406 A * | 4/1999 | Brophy | F28D 19/044 165/8 |
| 5,911,271 A | 6/1999 | Fierle et al. | |
| 5,913,359 A | 6/1999 | Milligan et al. | |
| 2003/0178173 A1 | 9/2003 | Harting et al. | |

OTHER PUBLICATIONS

PCT International Preliminary Report on Patentability issued in PCT Application No. PCT/US2017/043457, dated Jun. 20, 2018, pp. 1-27.

* cited by examiner

FIG. 6

BASKET FOR HEAT TRANSFER ELEMENTS FOR A ROTARY AIR PREHEATER

CROSS REFERENCE TO RELATED APPLICATIONS

This application is a national stage application of and claims priority to PCT Application No. PCT/US2017/043457, filed Jul. 24, 2017, which is a PCT Application of and claims priority to U.S. patent application Ser. No. 15/219,800, filed Jul. 26, 2016, the subject matter of aforementioned applications are hereby incorporated by reference in their entireties.

FIELD OF THE INVENTION

The present invention relates generally to a basket for receiving heat transfer elements for a rotary air preheater in which high temperature flue gases and air flow though, and more specifically to a light weight metallic basket that includes one or more heavy gauge side structural support and wear resistant walls that help contain air and gas flows laterally within the basket.

BACKGROUND OF THE INVENTION

Rotary air preheaters typically have a plurality of pie shaped sectors, each of which have several baskets containing heat transfer elements therein. The heat transfer elements are typically manufactured from corrugated metallic plates. Each basket contains a plurality of the heat transfer elements. The baskets are constructed to orient the heat transfer elements in a flow direction of flue gas and air through the air preheater. Since the heat transfer elements are of a substantive weight, the baskets have a structure sufficient to support the weight of the heat transfer elements. The overall weight of the baskets and the heat transfer elements are supported by a spindle mounted on bearings that enable rotation of the sectors. High weight baskets can cause the bearings to become overloaded. In addition, high weight baskets are expensive to manufacture.

It is known that the heat transfer elements can become fouled with ash deposits thereby reducing the effectiveness of the air preheater. Soot blowing arrangements have been employed to clean the ash deposits off of the heat transfer elements. However, the soot blowing operations can erode or crack portions of the basket.

In addition, some prior art baskets do not keep air and gas flows laterally contained within the basket, but instead allow a portion of the air and gas flow to bypass the heat transfer elements in the basket and to flow through empty gaps between the basket of heat transfer elements and the rotor structure. Such lack of lateral containment and bypass flow reduces heat transfer and air preheater effectiveness.

U.S. Pat. No. 5,913,359 provides a picture frame type basket with all four sides of the basket having liners secured to the inside of the picture frame.

Thus, there is a need for an improved lighter weight basket for heat transfer elements that is resistant to erosion and other effects of soot blowing and that has improved heat transfer and that results in an improved heat transfer effectiveness of the air preheater.

SUMMARY

In one aspect, the present invention resides in a basket for receiving heat transfer elements for a rotary air preheater. The basket includes two metallic frames each having two elongate corner pieces and two elongate connector pieces. Each of the corner pieces has a two leg angled cross section and each of the connector pieces are substantially flat. For each frame, one of the connector pieces is secured to one end of each of the corner pieces and another of the connector pieces is secured to an opposite end of each of the corner pieces such that the corner pieces are spaced apart from and parallel to one another and the connector pieces are spaced apart from and parallel to one another thereby forming a rectangular opening in each frame. The basket includes two heavy gauge metallic sheets (e.g., 12 gauge). Each sheet has opposite edges secured longitudinally along one of the corner pieces, thereby spacing the frames equally apart from and parallel to one another, thereby forming a channel between the two sheets. The channel has a longitudinal axis that is parallel to and bounded by the corner pieces. The channel is configured to receive heat transfer elements having a flow direction coaxial with the channel.

In one embodiment, the basket includes a metallic closure grid secured, at each opposing end of the channel, to two of the connector pieces and two of the sheets. The closure grid has a plurality of openings therein. The openings are configured to convey a flow of a fluid therethrough. The closure grid is configured to secure the heat transfer elements in the channel between the two closure grids.

In another aspect, the present invention resides in a method of retrofitting a basket for receiving heat transfer elements for a rotary air preheater. The method includes at least partially disassembling the basket, removing worn, inefficient or antiquated heat transfer elements from the basket, positioning new or refurbished heat transfer elements in the basket; and reassembling the basket.

DETAILED DESCRIPTION OF THE INVENTION

Figure 1:
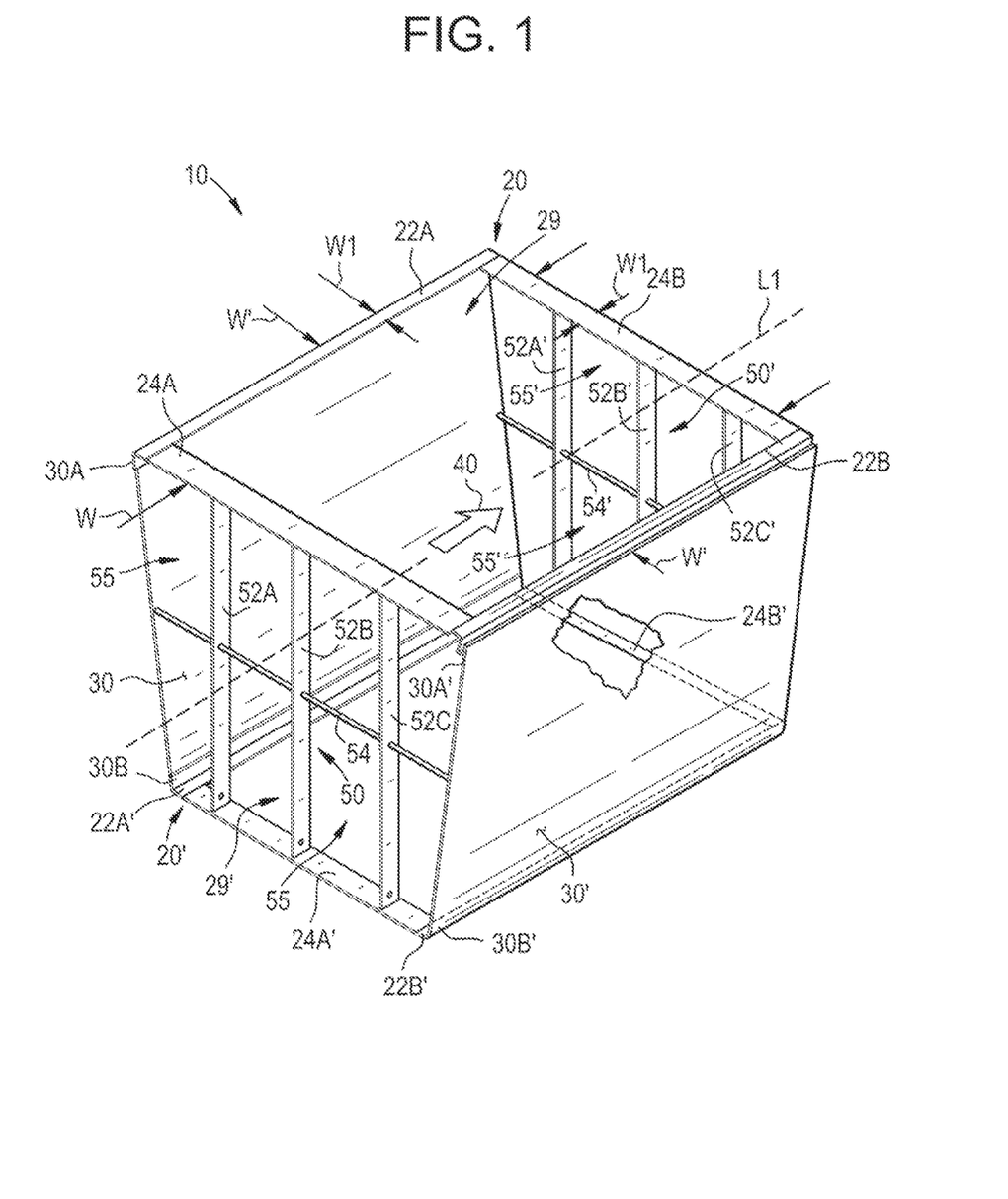
FIG. 1 is a perspective view of the basket of the present invention.
Figure 2:
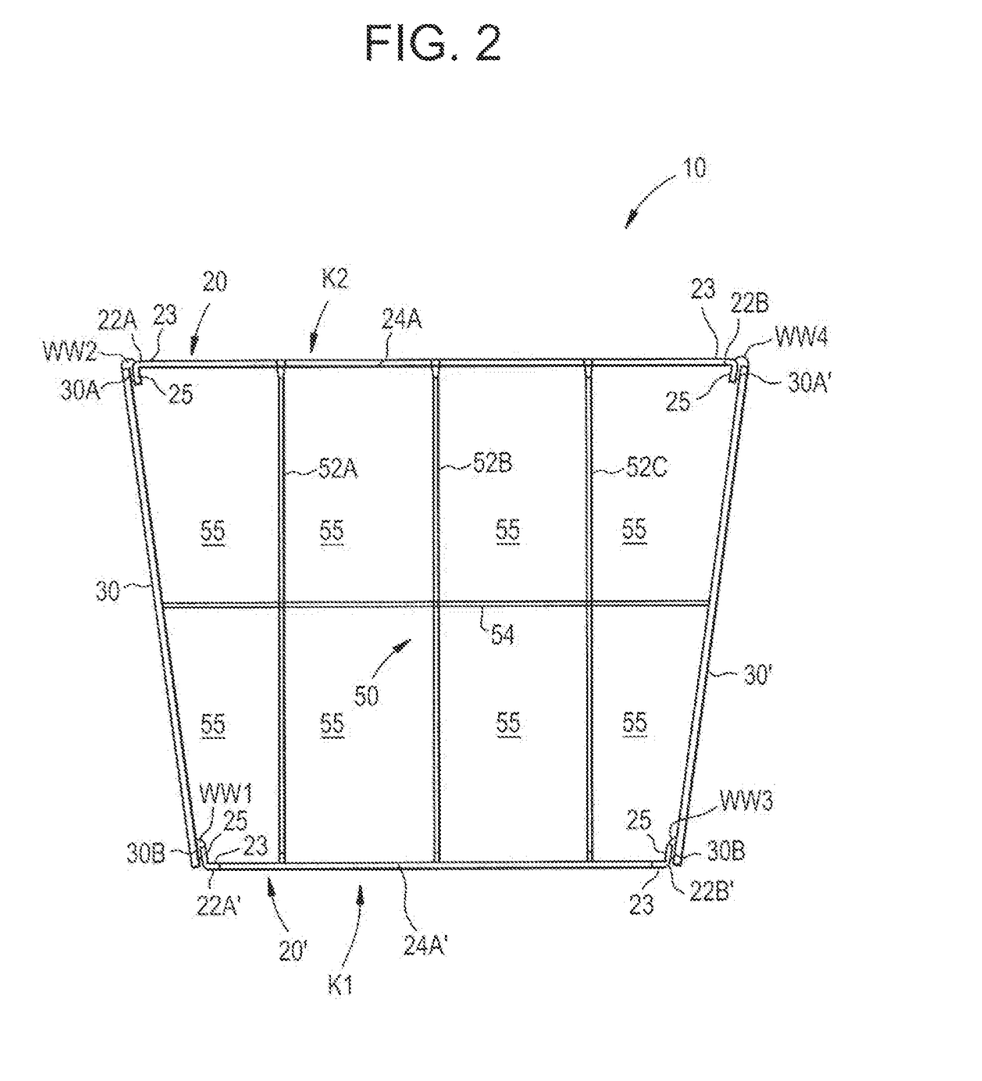
FIG. 2 is a front view of the basket of FIG. 1.

Referring to FIGS. 1 and 2, a basket for receiving a stack 80 of heat transfer elements 88 (see FIG. 5 for the stack 80 of heat transfer elements 88) for a rotary air preheater is generally designated by the numeral 10. The basket 10 is configured for receiving the stack 80 of heat transfer elements 88 for the rotary air preheater and withstanding high temperature (e.g., 130° C. or greater) flue gas and air flow. The basket 10 includes two metallic frames 20 and 20' each having two elongate corner pieces 22A, 22B and 22A', 22B' and two elongate connector pieces 24A, 24B and 24A', 24B' (24B' shown partially in dashed lines and through a cutaway portion of sheet 30'). The corner pieces 22A, 22B and 22A', 22B' and connector pieces 24A, 24B and 24A', 24B' are all manufactured from a metallic material such as, but not limited to, a carbon steel alloy. The corner pieces 22A, 22B and 22A', 22B' and connector pieces 24A, 24B and 24A', 24B' are positioned at a perimeter of the frame 20, 20'.

Figure 3:
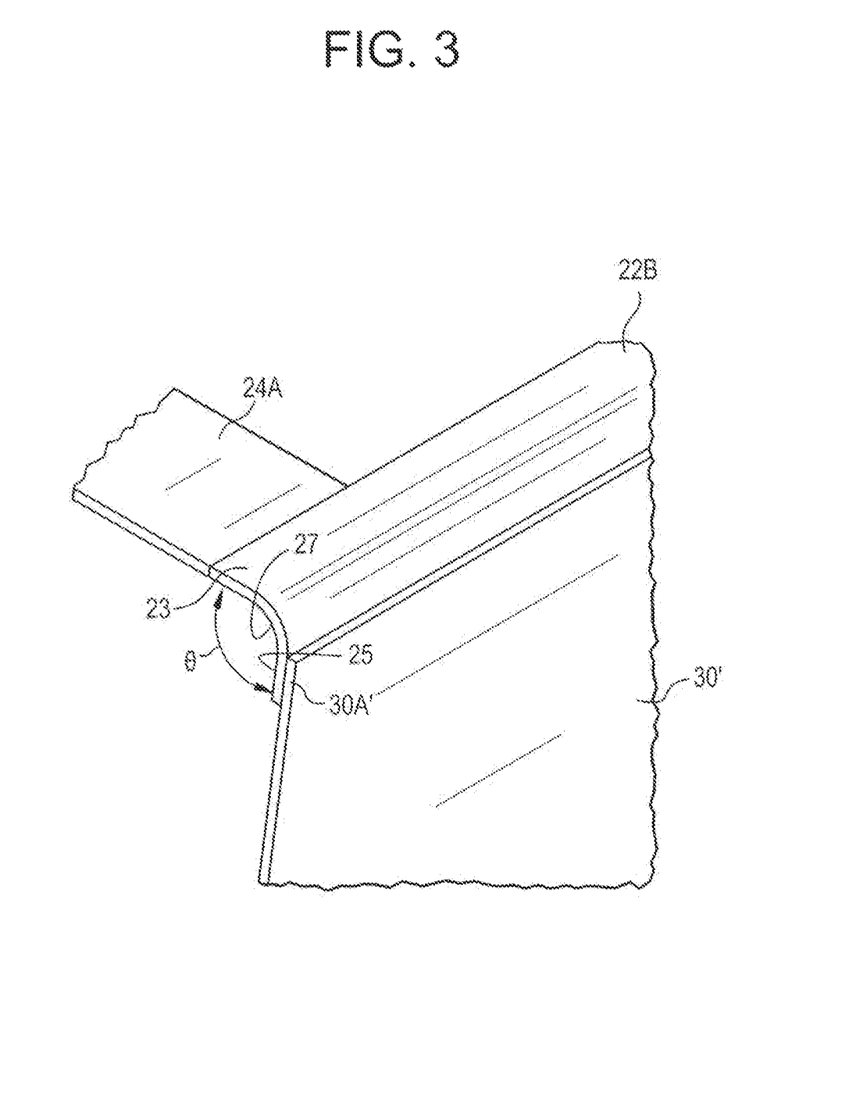
FIG. 3 is an enlarged view of a corner of the basket of FIG. 1.
Figure 4:
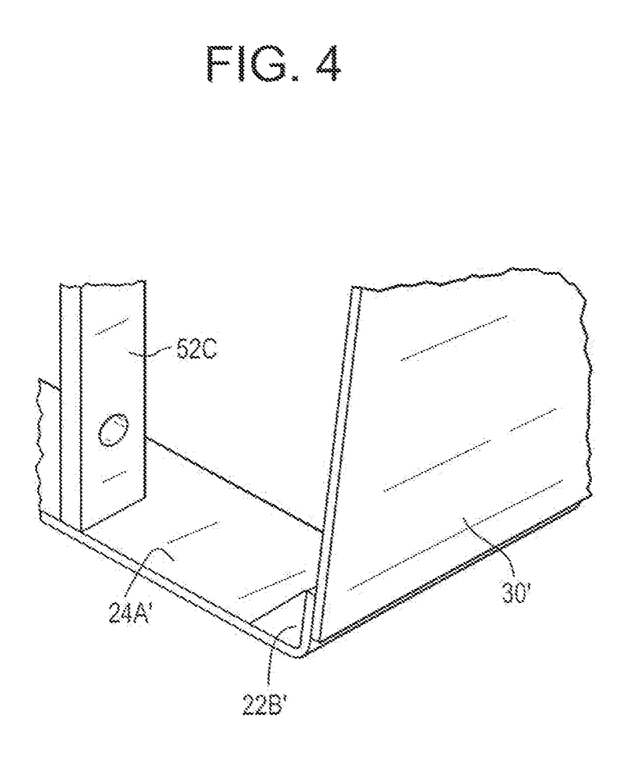
FIG. 4 is an enlarged view of another corner of the basket of FIG. 1.

As best shown in FIG. 3, the corner piece 22B has a two leg angled cross section. The corner piece 22B is defined by two elongate sections 23, 25 that extend an entire length of the corner piece 22B. Each of the elongate sections 23, 25 extend laterally outward from a bend 27 at an angle θ from one another. The angle θ is obtuse (i.e., 180°<θ<90°) for two of the corner pieces 22A' and 22B' and the angle θ is acute (i.e., θ>90°) for two of the corner pieces 22A and 22B. The corner piece 22A is configured the same as the corner piece 22B. The corner pieces 22A' and 22B' are configured the same as the corner pieces 22A and 22B with the exception of that the angle θ is obtuse.

As best shown in FIG. 3, the connector piece 24A is shown in a preferred embodiment as being substantially flat. The connector pieces 24B, 24A' and 24B' are also shown as being substantially flat. However, the present invention is not limited in this regard, as other configurations and cross sections may be employed, including, but not limited to, angled cross sections and arcuate cross sections. The connector pieces 24A and 24B of the frame 20 are longer than the connector pieces 24A' and 24B' of the other frame 20'.

As shown in FIG. 1, for the frame 20, the connector piece 24A is secured (e.g., by welding) to one end of each of the corner pieces 22A and 22B and the connector piece 24B is secured (e.g., by welding) to an opposite end of each of the corner pieces 22A and 22B, such that the corner pieces 22A and 22B are spaced apart from and parallel to one another and the connector pieces 24A and 24B are spaced apart from and parallel to one another, thereby forming a rectangular opening 29 in the frame 20. For the frame 20', the connector piece 24A' is secured (e.g., by welding) to one end of each of the corner pieces 22A' and 22B' and the connector piece 24B' is secured (e.g., by welding) to an opposite end of each of the corner pieces 22A' and 22B' such that the corner pieces 22A' and 22B' are spaced apart from and parallel to one another and the connector pieces 24A' and 24B' are spaced apart from and parallel to one another, thereby forming a rectangular opening 29' in the frame 20'.

As shown in FIGS. 2 and 3, outside surfaces of the connector pieces 24A, 24B and 24A', 24B' of each frame 20, 20' are coplanar with outside surfaces of the elongate sections 23 of the corner pieces 22A, 22B and 22A', 22B' of the respective frame 20, 20'.

Figure 5:
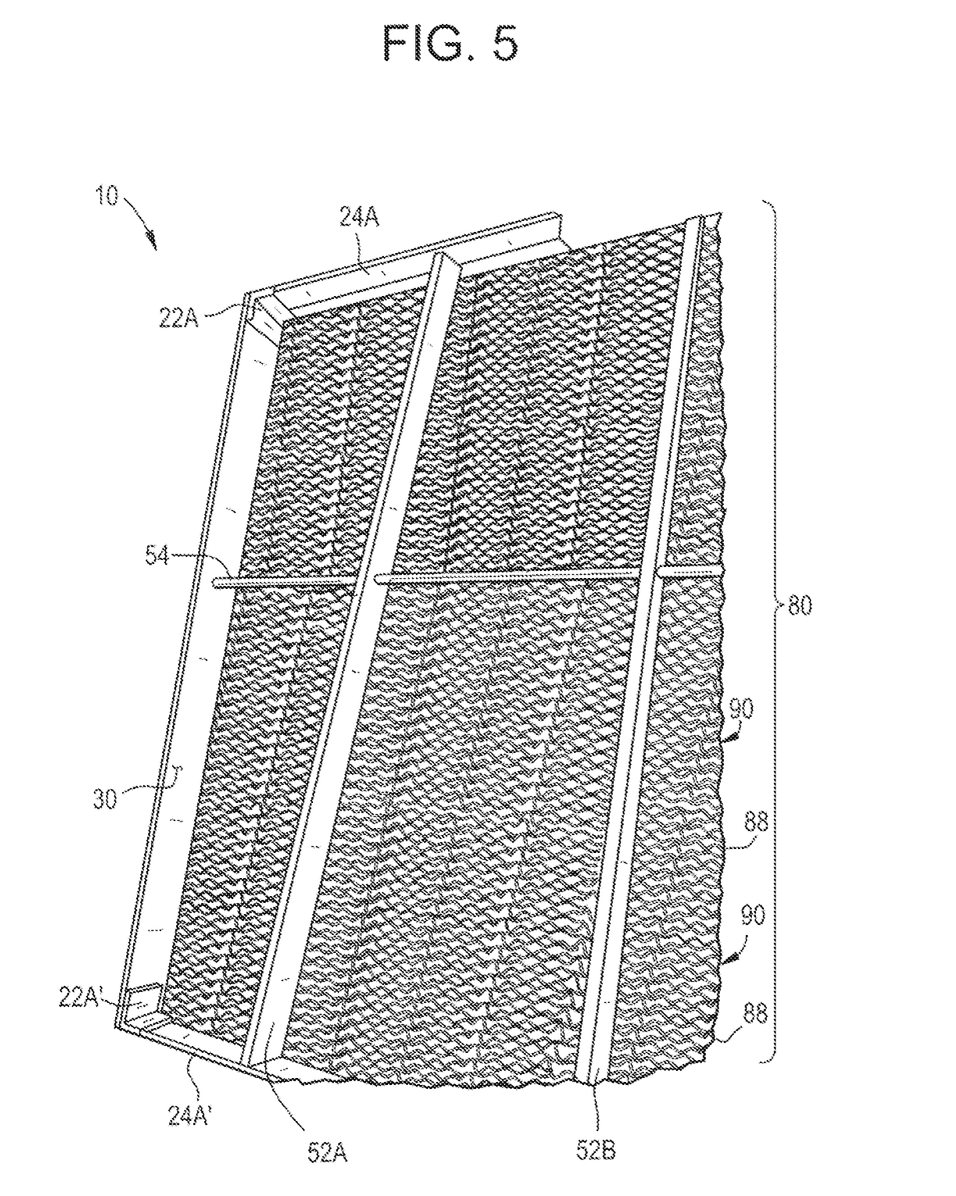
FIG. 5 is an enlarged view of a portion of the basket of FIG. 1 shown with a stack of heat transfer elements disposed therein.
Figure 6:
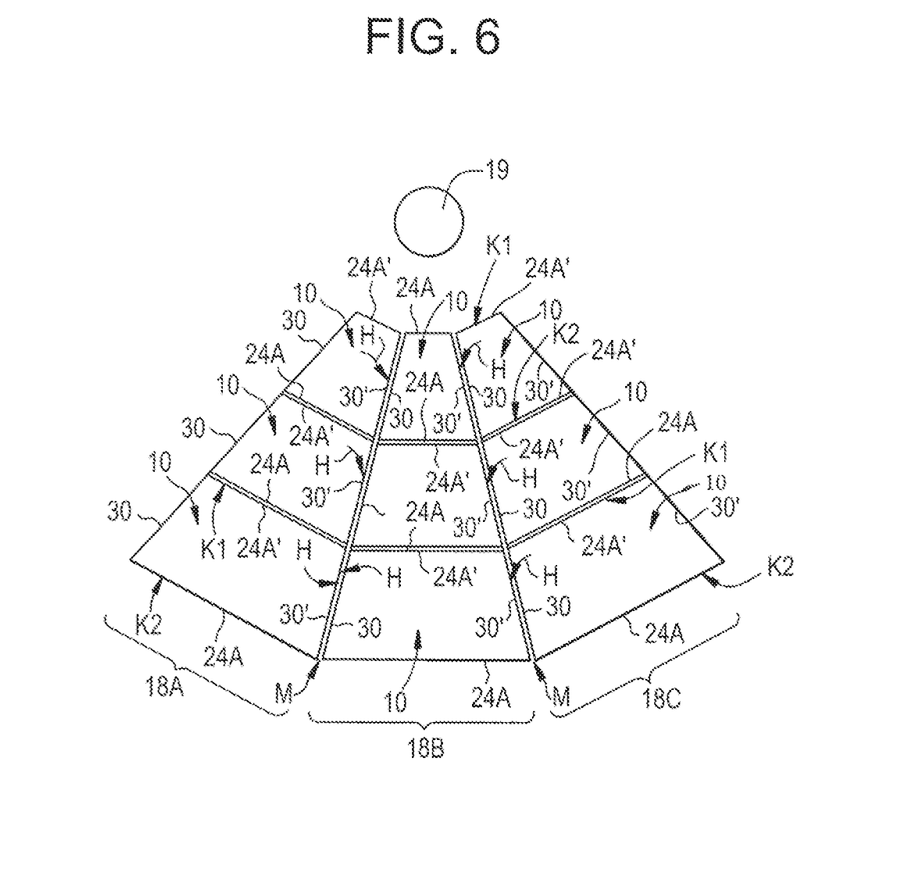
FIG. 6 is a top schematic view of a portion of a rotary air preheater with basket shown in portions of three sectors.

As shown in FIGS. 1 and 2, the basket 10 includes two heavy gauge metallic sheets 30 and 30' that are wear resistant (e.g., resistant to wear and/or cracking resulting from soot blowing) and are structural support members of the basket 10. For example, each of the sheets is 12 gauge. In one embodiment, the sheets are 11 gauge. In another embodiment the sheets are 12 to 10 gauge. The sheets 30 and 30' are manufactured from a metallic material such as, but not limited to, a carbon steel alloy. The sheet 30 has opposite edges 30A and 30B secured longitudinally along (e.g., along an outside surface of the elongate section 25) one of the corner pieces 22A and 22A', respectively. For example, for the sheet 30, the edge 30B that is located on an inboard side K1 (i.e., a side of the basket configured to face a rotor post 19 as shown in FIG. 6 of an air preheater) of the basket 10 is secured to the corner piece 22A' by a weld WW1 on an inside portion of the edge 30B; and the edge 30A that is located on an outboard side K2 (i.e., a side of the basket configured to face away from the rotor post 19 as shown in FIG. 6 of an air preheater) of the basket 10 is secured to the corner piece 22A by a weld WW2 on an outside portion of the edge 30A. The sheet 30' has opposite edges 30A' and 30B' secured longitudinally along (e.g., along an outside surface of the elongate section 25) one of the corner pieces 22B and 22B', respectively. For example, for the sheet 30', the edge 30B' that is located on the inboard side K1 of the basket 10 is secured to the corner piece 22B' by a weld WW3 on an inside portion of the edge 30B'; and the edge 30A' that is located on the outboard side K2 of the basket 10 is secured to the corner piece 22B by a weld WW4 on an outside portion of the edge 30A'. The sheets 30 and 30' space the frames 20 and 20' equally apart from and parallel to one another thereby forming a channel 40 between two of the sheets 30 and 30'. The channel 40 has a longitudinal axis L1 that is parallel to and bounded by the corner pieces 22A, 22B and 22A', 22B'. The channel 40 is configured to receive heat transfer sheets (as shown in FIG. 5) having a flow direction coaxial with the channel 40. In one embodiment, the channel 40 has a trapezoidal cross section.

While the welds WW1, WW2, WW3 and WW4 are shown and described, the present invention is not limited in this regard as other locations of welds and/or fasteners may be employed without departing from the broader aspects of the present invention.

As shown in FIG. 6, a plurality of baskets 10 are shown positioned in adjacent sectors 18A, 18B and 18C portions of which are mounted in a cut away portion of an air preheater, radially outward of a rotor post 19. The sheets 30 and 30' are a barrier for preventing lateral bypass of gas and air flow between sides of the baskets 10 at edges of the heat transfer elements 88 (see FIG. 5) in the direction of the arrows H and into a gap M between the adjacent sectors 18A, 18B and 18C. Thus, the sheets 30 and 30' laterally contain the gas and air flow within the basket 10, thereby improving heat transfer and improving the effectiveness of the air preheater having the stack 80 of heat transfer elements 88 in the basket 10 installed in the air preheater as compared to heat transfer elements in baskets with open lateral sides.

As shown in FIGS. 1 and 2, the basket 10 includes a closure grid 50 and 50' positioned at each opposing end of the channel 40. The closure grid 50 is shown having three closure strips 52A, 52B and 52C. Each of the three closure strips 52A, 52B and 52C have one end thereof secured to an inside facing surface of the connector piece 24A and an opposing end thereof secured to an inside facing surface of the connector piece 24A', for example by welding. The closure grid 50 includes one cross piece 54 extending through and secured to the closure strips 52A, 52B and 52C, for example by welding. One end of the cross piece 54 is secured to the sheet 30 and an opposite end of the cross piece 54 is secured to the sheet 30', for example by welding. The closure grid 50 has a plurality of openings 55 therein. The openings 55 are configured to convey a flow of a fluid therethrough and into the channel 40.

Each of the three closure strips 52A', 52B' and 52C' have one end thereof secured to an inside facing surface of the connector piece 24B and an opposing end thereof secured to an inside facing surface of the connector piece 24B', for example by welding. The closure grid 50' includes one cross piece 54' extending through and secured to the closure strips 52A', 52B' and 52C', for example by welding. One end of the cross piece 54' is secured to the sheet 30 and an opposite end of the cross piece 54' is secured to the sheet 30', for example by welding. The closure grid 50' has a plurality of openings 55' therein. The openings 55' are configured to convey a flow of a fluid therethrough and into the channel 40. The closure grids 50 and 50' are configured to secure the stack 80 of heat transfer elements 88 in the channel 40 between the two closure grids 50 and 50'. The closure grids 50 and 50' also provide lateral support between and prevent bowing of the sheets 30 and 30'. The closure grids 50 and 50' further provide lateral support between and prevent bowing of the respective pairs of connector pieces 24A, 24A' and 24B, 24B'.

While the closure grids 50 and 50' are shown having three closure strips 52A', 52B' and 52C' and one cross piece 54', the present invention is not limited in this regard as more or less than three closure strips and/or more than one cross piece may be employed, depending upon the size of the basket 10.

In one embodiment, corner pieces 22A, 22B and 22A', 22B' and connector pieces 24A, 24B and 24A', 24B' each have a width W1 that is less than 5 percent of an overall width W or W' of the frame 20, 20'.

Referring to FIGS. 1 and 5, the heat transfer elements 88 are, for example, corrugated sheets that have a plurality of undulations and sheet spacing features. The heat transfer elements 88 are positioned in a staggered configuration on top of one another in the basket 10 such that individual flow channels 90 are formed between adjacent heat transfer elements 88. The individual flow channels 90 are aligned in the same direction as the channel 40. During assembly, the heat transfer elements 88 are placed into the basket 10 from side having the opening 29 before the corner pieces 22A and 22B are secured to the sheets 30 and 30' and the connector pieces 24A and 24B, but with the remainder of the basket 10 assembled. The heat transfer elements 88 are stacked upon one another in the staggered configuration and pressed against each other. When the basket 10 is filled with a predetermined number of heat transfer elements 88 the corner pieces 22A and 22B are secured to the sheets 30 and 30' and the connector pieces 24A and 24B, for example by welding, to secure the heat transfer elements 88 pressed against one another in the basket 10 between the frame 20 and the frame 20'.

While the present disclosure has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A basket for receiving heat transfer elements for a rotary air preheater, the basket comprising:
two metallic frames each having two elongate corner pieces and two elongate connector pieces, each of the corner pieces having a two leg angled cross section, for each frame one of the connector pieces is secured to one end of each of the corner pieces and another of the connector pieces is secured to an opposite end of each of the corner pieces such that the corner pieces are spaced apart from and parallel to one another and the connector pieces are spaced apart from and parallel to one another thereby forming a rectangular opening in each frame; and
two heavy gauge metallic sheets, each of the heavy gauge metallic sheets:
being wear and crack resistant,
extending continuously across and covering an entirety of the rectangular opening in each frame, and
having opposite edges secured longitudinally along one of the corner pieces, thereby spacing the frames equally apart from and parallel to one another thereby forming a channel between the two heavy gauge metallic sheets, the channel having a longitudinal axis that is parallel to and bounded by the corner pieces, the channel being configured to receive heat transfer elements having a flow direction coaxial with the channel;
wherein each of the heavy gauge metallic sheets is a barrier for preventing lateral bypass of gas and airflow between sides of adjacent baskets at edges of heat transfer elements disposed in the baskets.

2. The basket of claim 1, wherein the heavy gauge sheets are 12 gauge.

3. The basket of claim 1, further comprising:
a metallic closure grid secured, at each opposing end of the channel, to two of the connector pieces and two of the sheets, the closure grid having a plurality of openings therein, the openings being configured to convey a flow of a fluid therethrough.

4. The basket of claim 1, wherein each of the connector pieces is substantially flat.

5. The basket of claim 1, wherein, the corner pieces each having two elongate sections, each elongate section extending outwardly from a bend at an angle from one another and wherein the angle is obtuse for two of the corner pieces and the angle is acute for two of the corner pieces.

6. The basket of claim 1, wherein at least one of the securing:
of opposite edges of each sheet longitudinally along of each of two of the corner pieces,
of one of the connector pieces to one end of each of the corner pieces and the securing of another of the connector pieces to an opposite end of each of the corner pieces, and
of the opposite edges of the sheets longitudinally along one of the corner pieces; is by welding.

7. The basket of claim 5, wherein the opposite edges of each sheet are secured to an outside surface of the each of the respective elongate section of each of two of the corner pieces.

8. The basket of claim 5, wherein outside surfaces of the connector pieces of each frame are coplanar with outside surfaces of one of the elongate sections of the corner pieces of the respective frame.

9. The basket of claim 1, wherein two of the connector pieces of one of the frames are longer than two of the connector pieces of the other frame.

10. The basket of claim 3, wherein the closure grid comprises:
at least one closure strip secured to opposing ones of the connector pieces; and
at least one cross piece extending through and secured to the at least one closure strips and opposing ends of the at least one cross piece being secured to opposing ones of the sheets.

11. The basket of claim 1, wherein the connector pieces and the corner pieces each have a width that is less than 5 percent of an overall width of the frame.

12. The basket of claim 1, wherein the connector pieces and the corner pieces are positioned at a perimeter of the frame.

13. The basket of claim 1, further comprising a plurality of heat transfer elements stacked upon one another and disposed therein.

\* \* \* \* \*